(12) United States Patent
Shin

(10) Patent No.: US 12,489,921 B2
(45) Date of Patent: Dec. 2, 2025

(54) DATA INTERFACE DEVICE AND METHOD OF DISPLAY APPARATUS

(71) Applicant: LG Display Co., Ltd., Seoul (KR)

(72) Inventor: Sun Kyung Shin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 6 days.

(21) Appl. No.: 18/798,662

(22) Filed: Aug. 8, 2024

(65) Prior Publication Data

US 2025/0247558 A1 Jul. 31, 2025

(30) Foreign Application Priority Data

Jan. 29, 2024 (KR) .......................... 10-2024-0013185

(51) Int. Cl.
*H04N 19/597* (2014.01)
*H04N 13/383* (2018.01)
*H04N 19/176* (2014.01)

(52) U.S. Cl.
CPC ......... *H04N 19/597* (2014.11); *H04N 13/383* (2018.05); *H04N 19/176* (2014.11)

(58) Field of Classification Search
CPC .. H04N 19/597; H04N 13/161; H04N 19/176; H04N 13/178; H04N 19/167; H04N 19/70; H04N 13/194; H04N 9/8042; H04N 21/816; H04N 23/698; H04N 13/344; G06F 3/013; G09G 5/006; G02B 27/017
See application file for complete search history.

(56) References Cited

U.S. PATENT DOCUMENTS

| | | | |
|---|---|---|---|
| 8,315,466 B2 | 11/2012 | El-Maleh et al. | |
| 8,744,203 B2 | 6/2014 | El-Maleh et al. | |
| 9,819,935 B2 | 11/2017 | Bae et al. | |
| 11,303,882 B2 | 4/2022 | Bae et al. | |
| 2008/0152245 A1 | 6/2008 | El-Maleh et al. | |
| 2012/0213409 A1 | 8/2012 | El-Maleh et al. | |
| 2016/0173886 A1 | 6/2016 | Bae et al. | |
| 2018/0070076 A1 | 3/2018 | Bae et al. | |
| 2020/0051367 A1* | 2/2020 | Larsen | G07F 17/3239 |
| 2020/0177875 A1 | 6/2020 | Bae et al. | |
| 2020/0404078 A1* | 12/2020 | Iyer | H04W 4/021 |

FOREIGN PATENT DOCUMENTS

| | | |
|---|---|---|
| KR | 10-2009-0094317 A | 9/2009 |
| KR | 10-2016-0072512 A | 6/2016 |
| KR | 10-2017-0094745 A | 8/2017 |
| KR | 10-2023-0032125 A | 3/2023 |

* cited by examiner

*Primary Examiner* — Farhan Mahmud
(74) *Attorney, Agent, or Firm* — Fenwick & West LLP

(57) ABSTRACT

A data interface device of a display apparatus includes a packet configuration circuit configured to divide compressed and/or non-compressed image data into a plurality of data groups, divide each of the plurality of data groups into a plurality of subgroups, divide each of the plurality of subgroups into a plurality of sub-blocks, and configure a transfer data packet including a header packet and an image data packet by units of one data group, based on an eye-gaze focus of a user. The header packet includes a first compression delimiter parameter representing a representative compression case distribution of the one data group and a second compression delimiter parameter representing detailed compression case distributions of subgroups configuring the one data group.

12 Claims, 14 Drawing Sheets

[ 1 DG ]

| MCS [1:0] | DIVISION |
|---|---|
| 0 | 1x1 (비초점영역) → 2x2 (SEMI-FOCAL REGION) |
| 1 | 2x2 (SEMI-FOCAL REGION) → 1x1 (NON-FOCAL REGION) |
| 2 | 2x2 (SEMI-FOCAL REGION) → 4x4 (FOCAL REGION) |
| 3 | 4x4 (FOCAL REGION) → 2x2 (SEMI-FOCAL REGION) |

| G0/G1/G2/G3_LEN [2:0] | number of 1st ENC case | number of 2nd ENC case |
|---|---|---|
| 0 | 0 | 4 |
| 1 | 0 | 3 |
| 2 | 0 | 2 |
| 3 | 0 | 1 |
| 4 | 1 | 3 |
| 5 | 2 | 2 |
| 6 | 3 | 1 |
| 7 | 4 | 0 |

- MCS[1:0]=2 (2x2 → 4x4)
- G0_LEN [2:0]=6 : 2x2(3EA) → 4x4(1EA)
- G1_LEN [2:0]=4 : 2x2(1EA) → 4x4(3EA)
- G2_LEN [2:0]=4 : 2x2(1EA) → 4x4(3EA)
- G3_LEN [2:0]=0 : 2x2(0EA) → 4x4(4EA)

- MCS[1:0]=3 (4x4 → 2x2)
- G0_LEN [2:0]=7 : 4x4(4EA) → 2x2(0EA)
- G1_LEN [2:0]=4 : 2x2(1EA) → 4x4(3EA)
- G2_LEN [2:0]=4 : 2x2(1EA) → 4x4(3EA)
- G3_LEN [2:0]=6 : 2x2(3EA) → 4x4(1EA)

- MCS[1:0]=3 (4x4 → 2x2)
- G0_LEN [2:0]=4 : 4x4(1EA) → 2x2(3EA)
- G1_LEN [2:0]=6 : 4x4(3EA) → 2x2(1EA)
- G2_LEN [2:0]=6 : 4x4(3EA) → 2x2(1EA)
- G3_LEN [2:0]=7 : 4x4(4EA) → 2x2(0EA)

- MCS[1:0]=3 (4x4 → 2x2)
- G0_LEN [2:0]=7 : 4x4(4EA) → 2x2(0EA)
- G1_LEN [2:0]=6 : 4x4(3EA) → 2x2(1EA)
- G2_LEN [2:0]=6 : 4x4(3EA) → 2x2(1EA)
- G3_LEN [2:0]=4 : 4x4(1EA) → 2x2(3EA)

FIG. 16

| RELATED ART | TOTAL NUMBER OF DATA | R,G,B | bit width | number of data | | | number of Header |
|---|---|---|---|---|---|---|---|
| | | | | NON-FOCAL REGION | SEMI-FOCAL REGION | FOCAL REGION | |
| | 14,186,880 | 3 | 8 | 517,872 | 1,280 | 7,168 | 64,800 |
| EMBODIMENT | TOTAL NUMBER OF DATA | R,G,B | bit width | number of data | | | number of Header |
| | | | | NON-FOCAL REGION | SEMI-FOCAL REGION | FOCAL REGION | |
| | 13,409,280 | 3 | 8 | 517,872 | 1,280 | 7,168 | 32,400 |

FIG. 17

| | DG size (16x16) | DG size (32x32) | INCREASE RATE (%) |
|---|---|---|---|
| RELATED ART | 32 bit | 128 bit | 400 |
| EMBODIMENT | 14 bit | 26 bit | 186 |

DATA INTERFACE DEVICE AND METHOD OF DISPLAY APPARATUS

CROSS-REFERENCE TO RELATED APPLICATION

This application claims the benefit of Republic of Korea Patent Application No. 10-2024-0013185 filed on Jan. 29, 2024, which is hereby incorporated by reference in its entirety.

BACKGROUND

Technical Field

The present disclosure relates to a data interface device and method of a display apparatus.

Discussion of the Related Art

Virtual reality (VR) technology are being applied to the fields of national defense, architecture, tour, movie, multimedia, and game. VR denotes a specific environment and situation felt similar to a real environment by using stereoscopic image technology. To maximize the immersion of VR, VR technology is being applied to personal immersion display apparatuses. Head mounted display (HMD), face mounted display (FMD), and eye glasses-type display (EGD) are representative apparatuses to which a personal immersion display apparatus is applied.

An encoder and a decoder included in a personal immersion display apparatus transfer or receive image data through a data interface device. The encoder adjusts the degree of compression of image data. A compression delimiter representing the degree of compression of image data may be transferred with being added to a header packet. The header packet including the compression delimiter is transferred to the decoder through the data interface device along with an image data packet.

In a case where a compression delimiter is individually assigned to each specific region and is transferred to a header packet through simple arrangement, a size of the header packet may increase. When a size of a heater packet increases, the transfer load of an interface device may increase, causing a reduction in transfer performance.

SUMMARY

To overcome the aforementioned problem of the related art, the present disclosure may provide a data interface device and method of a display apparatus, in which a size of a header packet may decrease and data transfer performance may increase when transferring image data with being compressed.

To achieve these objects and other advantages and in accordance with the purpose of the disclosure, as embodied and broadly described herein, a data interface device of a display apparatus includes a packet configuration unit configured to divide compressed and/or non-compressed image data into a plurality of data groups, divide each of the plurality of data groups into a plurality of subgroups, divide each of the plurality of subgroups into a plurality of sub-blocks, and configure a transfer data packet including a header packet and an image data packet by units of one data group, based on an eye-gaze focus of a user.

In another embodiment of the present disclosure, a data interface method of a display apparatus includes: dividing compressed and/or non-compressed image data into a plurality of data groups, dividing each of the plurality of data groups into a plurality of subgroups, and dividing each of the plurality of subgroups into a plurality of sub-blocks, based on an eye-gaze focus of a user; and configuring a transfer data packet including a header packet and an image data packet by units of one data group.

In the data interface device and method according to an embodiment of the present disclosure, the header packet may include a first compression delimiter parameter representing a representative compression case distribution of the one data group and a second compression delimiter parameter representing detailed compression case distributions of subgroups configuring the one data group.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

12A, 12B, 12C and 12D are diagrams illustrating configuration examples of first and second compression delim

FIG. 16 is a diagram illustrating an example where a size of a header packet decreases compared to the related art according to an embodiment of the present disclosure.

FIG. 17 is a diagram illustrating a comparison result of a size increase rate of a header packet based on a size of one data group comparing with the related art according to an embodiment of the present disclosure.

DETAILED DESCRIPTION

Figure 1:
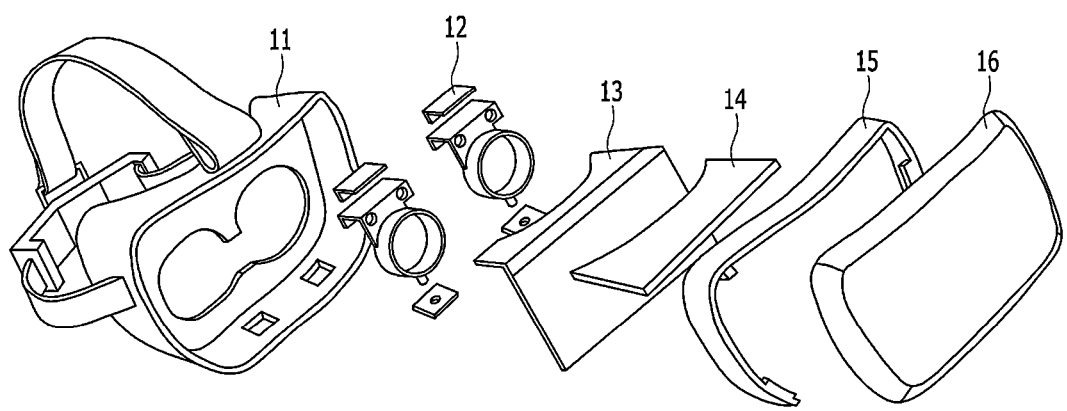
FIG. 1 is an exploded perspective view illustrating a personal immersion display apparatus according to an embodiment of the present disclosure.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~", "over~", "under~", and "next~", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

Referring to FIG. 1, a display apparatus according to the present embodiment may be a personal immersion display apparatus. The personal immersion display apparatus may include a lens module 12, a display module 13, a main board 14, a head gear 11, a side frame 15, and a front cover 16.

The display module 13 may include a display panel driving circuit for driving each of two display panels and may display an input image received from the main board 14. The display panels may be divided into a first display panel which is seen with a left eye of a user and a second display panel which is seen with a right eye of the user. The display module may display image data, input from a main board, on the display panels. The image data may be two-dimensional (2D)/three-dimensional (3D) image data for implementing a video image of virtual reality (VR) or augmented reality (AR). The display module 13 may display various information, input from the main board, in the form of texts and signs.

The lens module 12 may include an extreme wide angle lens (i.e., a pair of fisheye lenses) for widening a left-eye viewing angle and a right-eye viewing angle of the user. The pair of fisheye lenses may include a left-eye lens which is disposed at a front portion of the first display panel and a right-eye lens which is disposed at a rear portion of the second display panel.

Figure 4:
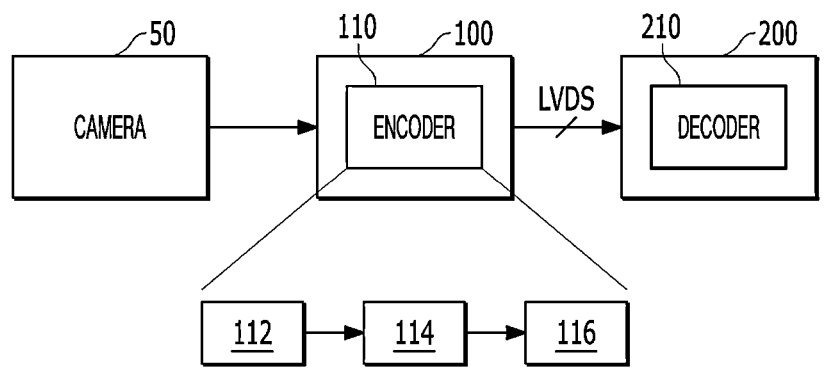
FIG. 4 is a diagram illustrating a connection configuration between a camera, a timing controller, and a data driver included in a display apparatus according to an embodiment of the present disclosure.

A camera for photographing an eye-gaze focus of the user may be disposed in the lens module 12. As illustrated in FIG. 4, the camera may photograph both eyes of the user and may transfer photographed information to an encoder 110.

The main board 14 may include a processor which executes VR software and supplies a left-eye image and a right-eye image to the display module 13. Also, the main board 14 may include a sensor module and an interface module connected to an external device. The interface module may be connected to an external device through an interface such as a universal serial bus (USB) or a high definition multimedia interface (HDMI). The sensor module may include various sensors such as a gyro sensor and an acceleration sensor.

In response to an output signal of the sensor module, the processor of the main board 14 may correct left-eye and right-eye image data and may transfer left-eye and right-eye image data of an input image, received through the interface module, to the display module 13. The processor may generate a left-eye image and a right-eye image suitable for a resolution of the display panel to transfer to the display module 13, based on a depth information analysis result of a 2D image.

The head gear 11 may include a back cover which exposes the fisheye lenses and a band which is connected to the back cover. The back cover, the side frame 15, and the front cover 16 of the head gear 11 may be assembled, and thus, an internal space where the elements of the personal immersion display apparatus are disposed may be secured and the elements may be protected. The elements may include the lens module 12, the display module 13, and the main board 14. The band may be connected to the back cover. The personal immersion display apparatus may be worn on a head of the user. When the personal immersion display apparatus is worn on the head of the user, the user may see different display panels with the left eye and the right eye through the fisheye lenses.

The side frame 15 may be fixed between the head gear 11 and the front cover 16 and may secure a gap in the internal space where the lens module 12, the display module 13, and the main board 14 are disposed. The front cover 16 may be disposed at a front surface of the personal immersion display apparatus.

The personal immersion display apparatus may be implemented in a head mounted display (HMD) structure as illustrated in FIG. 1, but is not limited to FIG. 1. For example, the present disclosure may be designed as an eye glasses-type display (EGD) having a glasses structure.

Figure 2:
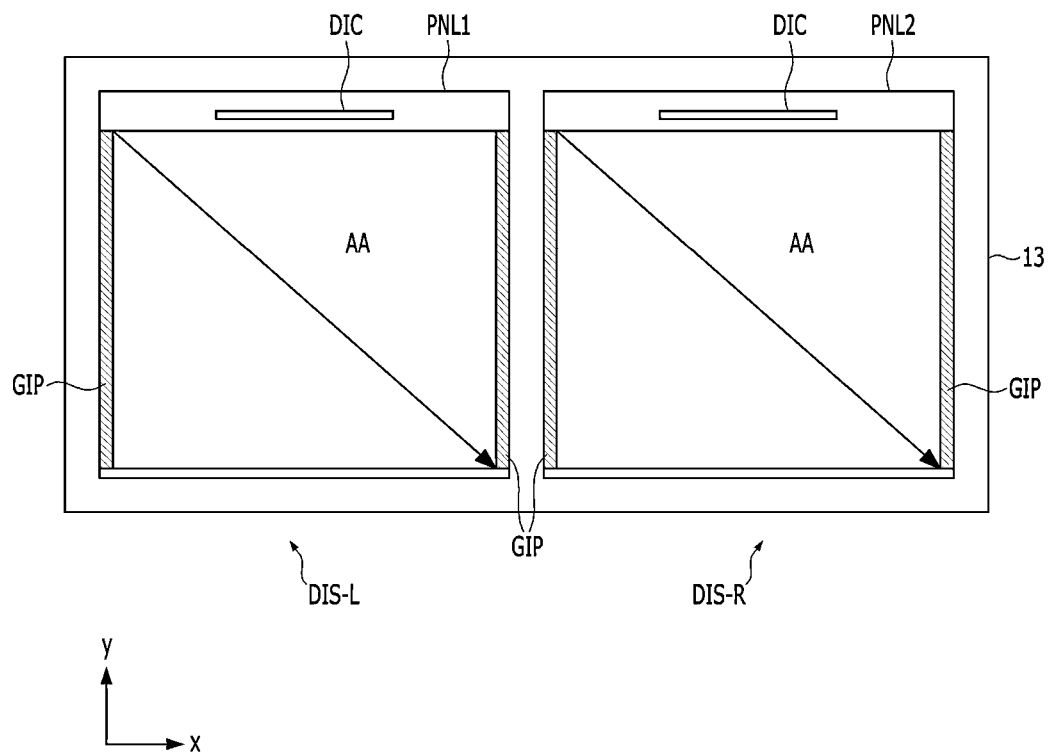
FIG. 2 is a diagram illustrating first and second display panels in a display module illustrated in FIG. 1 according to an embodiment of the present disclosure.
Figure 3:
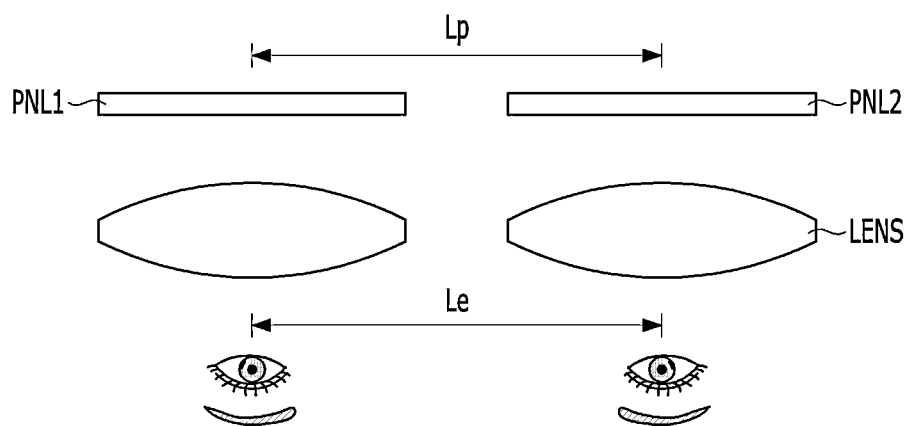
FIG. 3 is a diagram illustrating a distance between the first and second display panels illustrated in FIG. 2 according to an embodiment of the present disclosure.

FIG. 2 is a diagram illustrating first and second display panels PNL1 and PNL2 in the display module 13 illustrated in FIG. 1. FIG. 3 is a diagram illustrating a distance between the first and second display panels PNL1 and PNL2 illustrated in FIG. 2. Each of the first and second display panels PNL1 and PNL2 may be implemented as an organic light emitting diode (OLED) display panel which is fast in response time and good in color reproduction characteristic and has a wide viewing angle characteristic. In an EGD, each of the first and second display panels PNL1 and PNL2 may be implemented as a transparent OLED display panel.

Referring to FIGS. 2 and 3, the first and second display panels PNL1 and PNL2 may be separately manufactured and may be disposed apart from each other on the display module 13.

A drive integrated circuit (DIC) may be an integrated circuit (IC) chip into which a timing controller and a data driver are integrated. A gate in panel (GIP) may correspond to a gate driver and may output a scan signal and an emission (EM) signal. The GIP may be integrated in the same substrate along with a pixel array.

A distance Lp between a center of a pixel array AA of the first display panel PNL1 and a center of a pixel array AA of the second display panel PNL2 may be set to Le±α. A distance Le between both eyes of a user may be a distance between a left eye and a right eye and may be about 6.5 cm (=65 mm), and there may be a slight difference in races. In this case, α may be a design margin based on a process deviation and a display panel driving circuit disposed between the first display panel PNL1 and the second display panel PNL2 and may be set to 10% of Le.

The pixel array AA of each of the first and second display panels PNL1 and PNL2 may have a screen ratio of a landscape type where a length in a horizontal direction x is longer than a length in a vertical direction y, based on a vertical viewing angle and a horizontal viewing angle. In the personal immersion display apparatus, an effect of improving a viewing angle may be large when the horizontal viewing angle is more widened than the vertical viewing angle. In the personal immersion display apparatus, each of the first and second display panels PNL1 and PNL2 may be manufactured as an OLED display panel of a landscape type, so as to maximize or at least increase the horizontal viewing angle.

In a screen ratio of a landscape type, the number of pixels in the horizontal direction x may be more than the number of pixels in the vertical direction y, and a length in the horizontal direction x may be longer than a length in the vertical direction y. In a screen ratio of a portrait type, the number of pixels in the vertical direction y may be more than the number of pixels in the horizontal direction x, and a length in the vertical direction y may be longer than a length in the horizontal direction x.

The personal immersion display apparatus, a left eye of a user may match a center of a first pixel array, and a right eye of the user may match a center of a second pixel array. In a case where the pixel arrays of the first and second display panels PNL1 and PNL2 are separated from each other, and a distance between the centers of the pixel arrays matches the left eye and the right eye of the user, a viewing angle may be wide and an effect of improving a sense of three dimensions may be large.

In a screen ratio of a landscape type, a sense of three dimensions felt by a user may be better than a screen type of a portrait type. In the present embodiment, a left-eye display panel and a right-eye display panel of a landscape type may be disposed apart from each other in the personal immersion display apparatus, and thus, a sense of three dimensions may increase.

The first pixel array AA and the second pixel array AA may be disposed at a ratio of 1:1 in substrates spaced apart from each other so that the first pixel array AA displaying a left-eye image is spaced apart from the second pixel array AA displaying a right-eye image. In this case, the first pixel array AA may be disposed on a substrate of the first display panel PNL1, and the second pixel array AA may be disposed on a substrate of the second display panel PNL2. In another embodiment, the first and second pixel arrays AA may be spaced apart from each other on one substrate. In this case, the pixel arrays may be spaced apart from each other in one display panel. Here, a case where the pixel arrays are spaced apart from each other may denote a case where a data line, a gate line (or a scan line), and pixels are spaced apart from one another. The first and second pixel arrays may be spaced apart from each other, but because the first and second pixel arrays may be driven based on the same driving signal system, the first and second pixel arrays may share at least a portion of the display panel driving circuit.

In a case where two pixel arrays AA are disposed apart from each other on one substrate, various effects as well as an effect of improving a sense of three dimensions may be provided. For example, an arrangement design of pixel arrays may be more freely performed, and the pixel arrays AA may be respectively arranged at an optimal viewing angle ratio of 1:1 with respect to a left eye and a right eye of a person, thereby maximizing or at least increasing a sense of three dimensions.

When an interval between the pixel arrays AA narrows, a screen size may decrease, and thus, a display image may be considerably narrow. When the interval between the pixel arrays AA is widened, a center position of the pixel arrays corresponding to both eyes of a user may move to an outer portion of a screen, and due to this, the degree of immersion and a sense of three dimensions may be reduced. When a distance between both eyes of a person is 65 mm and a center portion of separated pixel arrays AA accurately matches both pupils of the person, the person may more three-dimensionally recognize a stereoscopic image in a personal immersion apparatus. When an interval between pixel arrays is very narrow and is widened, a viewing angle may be optically compensated for by using a fisheye lens LENS, or a left-eye image and a right-eye image may be adjusted to match a distance between both eyes of a user through image processing, but such a method may cause a reduction in display efficiency in terms of a viewing angle. In other words, as in the present disclosure, when pixel arrays are spaced apart from each other and centers of the pixel arrays are accurately disposed at a ratio of 1:1 with respect to a left-eye pupil and a right-eye pupil of a user, the user may appreciate a very accurate stereoscopic image.

In the personal immersion display apparatus, a fisheye lens LENS may be between a display panel and eyes of a user, and a distance between the display panel and the eyes of the user may be several cm and may be very short. When a user sees an image reproduced on the first and second display panels PNL1 and PNL2 through the fisheye lens, the user may see an image which extends by four to five times a real screen displayed by the first and second display panels PNL1 and PNL2. When a resolution of a display panel is low in a proximity recognition and fisheye lens application environment, a non-emission region of each pixel may be enlarged, and thus, a screen door effect may be strongly recognized, causing a reduction in immersion. To increase the immersion of the personal immersion display apparatus, the pixel array of each of the first and second display panels PNL1 and PNL2 may have a resolution of QHD (1440× 1280) or more and a pixel density of 500 ppi (pixels per inch) or more and may have a pixel aperture ratio of 14% or more. In 1440×1280, 1440 may be the number of pixels in a horizontal direction x in the pixel array, and 1280 may be the number of pixels in a vertical direction y. Considering the technology level of producible OLED display panels, a pixel density may be 500 ppi to 600 ppi, and a pixel aperture ratio may be 14% to 20%.

In the personal immersion display apparatus, in a case which displays a 3D moving image, when a total latency increases, screen drag or motion blur may be recognized. The screen drag or motion blur of a 3D moving image may degrade image quality and may also increase the fatigue of a user. The total latency may be a time obtained by summating a display time of the display module 13 and a system processing time taken until the main board 14 processes data to transfer to the display module 13. A delay time of the display module 13 may be a time obtained by summating a response time of a pixel and a frame delay time where an input image is delayed during one frame period.

The personal immersion display apparatus may increase a frame rate or a refresh rate and may thus reduce the fatigue of a user when displaying a 3D moving image. To this end, in the present embodiment, a switch element and a driving element of a pixel in each of the first and second display panels PNL1 and PNL2 may each be manufactured as an n-type metal oxide semiconductor field effect transistor (MOSFET), and thus, a response time of a pixel circuit may be within 2 msec and may be fast and a frame rate may increase to 90 Hz or more, thereby allowing a data update period to be fast. When a frame rate is 90 Hz, one frame period which is a data update period may be about 11.1 msec. Accordingly, the personal immersion display apparatus may decrease a delay time of the display module 13 to about 13 msec and may thus reduce a total latency to 25 msec or less. Data of an input image may be addressed in pixels at a data update period.

FIG. 4 is a diagram illustrating a connection configuration between a camera, a timing controller, and a data driver included in a display apparatus according to the present embodiment.

Referring to FIG. 4, a camera 50 may photograph a left eye and a right eye of a user to detect a pupil position of the left eye and a pupil position of the right eye.

A timing controller 100 may include an eye-gaze focus detection unit 112, a data compression unit 114, and a packet configuration unit 116.

The eye-gaze focus detection unit 112 (e.g., a circuit) may determine an eye-gaze focus of a user, based on a two-eye image of the user captured by the camera 50. The eye-gaze focus detection unit 112 may detect a left eye-gaze focus gazed by the left eye of the user and a right eye-gaze focus gazed by the right eye of the user, based on a pupil position detected by the camera 50. The eye-gaze focus detection unit 112 may determine an eye-gaze focus by applying eye tracking technology known to those skilled in the art.

The data compression unit 114 (e.g., a circuit) may set a focal region, a semi-focal region, and a non-focal region, based on the detected left eye-gaze focus and right eye-gaze focus.

The focal region may be a region gazed at by the eyes of the user and may denote a first image region within a main viewing angle range of the user. The semi-focal region may be disposed outside the focal region. The semi-focal region may be a second image region which contacts the first image region corresponding to the focal region and surrounds the first image region. The non-focal region may be disposed outside the semi-focal region. The non-focal region may be a third image region which is disposed outside the second image region.

The semi-focal region may be disposed between the focal region and the non-focal region.

Based on the eye-gaze focus of the user, the packet configuration unit 116 may divide compressed and/or non-compressed image data into a plurality of data groups, divide each of the data groups into a plurality of subgroups, divide each of the subgroups into a plurality of sub-blocks, and configure a transfer data packet by units of one data group. The transfer data packet may include a header packet and an image data packet.

The packet configuration unit 116 (e.g., a circuit) may efficiently configure the header packet to decrease a size of the header packet. In other words, the header packet may be configured to include a first compression delimiter parameter representing a representative compression case distribution of one data group and a second compression delimiter parameter representing detailed compression case distributions of subgroups configuring the one data group, thereby contributing to increasing data transfer performance. The first compression delimiter parameter and the second compression delimiter parameter may represent compression division information about all sub-blocks included in the one data group.

A data driver 200 may be connected to the timing controller 100 through an internal interface circuit. A decoder 210 of the data driver 200 may be connected to an encoder 110 of the timing controller 100 through a low voltage differential signaling (LVDS) interface circuit and may receive a transfer data packet from the encoder 110.

The decoder 210 may recover image data of all sub-blocks of one data group to a before-compression original state by using compression division information included in a header packet of the transfer data packet.

Figure 5:
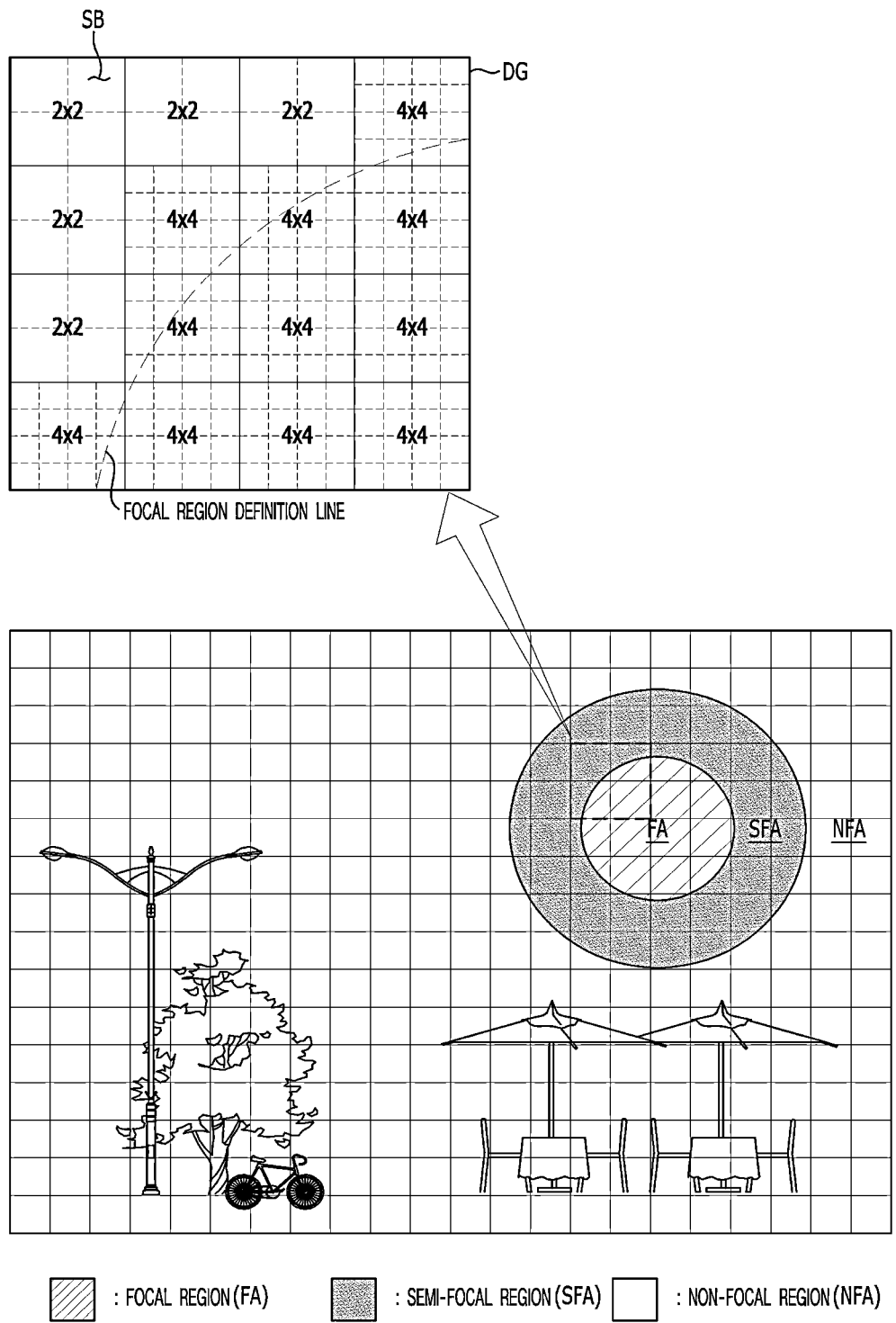
FIG. 5 is a diagram illustrating one data group and a focal region, a semi-focal region, and a non-focal region of image data defined based on an eye-gaze focus of a user according to an embodiment of the present disclosure.
Figure 6A:
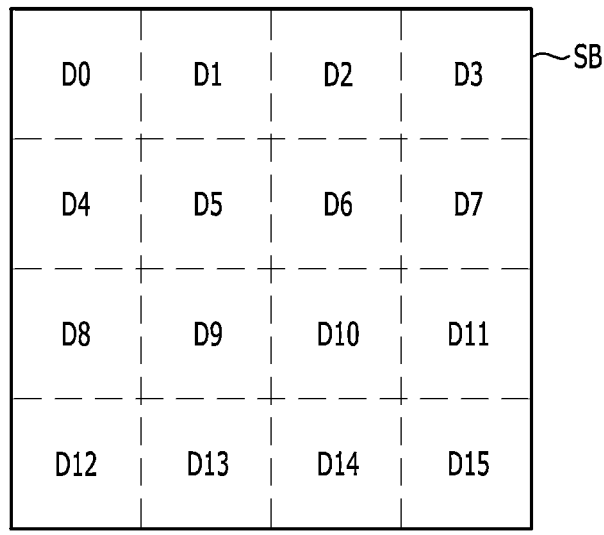
FIG. 6A is a diagram illustrating a sub-block of a focal region which is not compressed, corresponding to a first compression case according to an embodiment of the present disclosure.
Figure 6B:
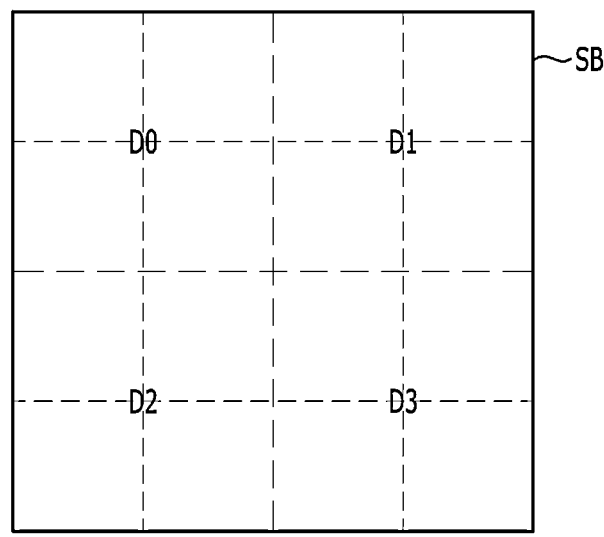
FIG. 6B is a diagram illustrating a sub-block of a semi-focal region which is compressed, corresponding to a second compression case according to an embodiment of the present disclosure.
Figure 6C:
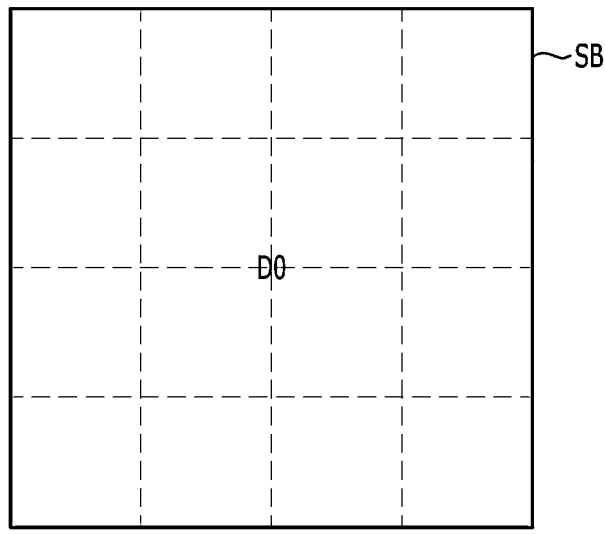
FIG. 6C is a diagram illustrating a sub-block of a non-focal region which is compressed, corresponding to a third compression case according to an embodiment of the present disclosure.

FIG. 5 is a diagram illustrating one data group and a focal region, a semi-focal region, and a non-focal region of image data defined based on an eye-gaze focus of a user. FIG. 6A is a diagram illustrating a sub-block of a focal region which is not compressed, according to a first compression case. FIG. 6B is a diagram illustrating a sub-block of a semi-focal region which is compressed, according to a second compression case. FIG. 6C is a diagram illustrating a sub-block of a non-focal region which is compressed, according to a third compression case.

Referring to FIG. 5, one data group DG may be used as a basic unit for configuring one transfer data packet. In FIG. 5, a size of the one data group DG is illustrated to be "16 pixel*16 pixel", but is not limited thereto. A size of the one data group DG may be changed based on a system.

The one data group DG configured with a size "16 pixel*16 pixel" may include 16 sub-blocks SB having a size "4 pixel*4 pixel". Each of the sub-blocks SB may have different compression codes "1×1, 2×2, and 4×4", based on a focal region FA, a semi-focal region SFA, or a non-focal region NFA.

The compression code "4×4" may be a compression delimiter of the focal region FA which is not compressed, based on the first compression case. The compression code "2×2" may be a compression delimiter of the semi-focal region SFA which is compressed at a first compression rate, based on the first compression case. The compression code "1×1" may be a compression delimiter of the non-focal region NFA which is compressed at a second compression rate, based on the third compression case.

FIG. 6A represents the first compression case. Referring to FIG. 6A, in each sub-block SB of the focal region FA, 16 pieces of image data may be processed into 16 pieces of encoding data D0 to D15 without being compressed.

FIG. 6B represents the second compression case. Referring to FIG. 6B, in each sub-block SB of the semi-focal region SFA, 16 pieces of image data may be compressed at the first compression rate and may thus be processed into 4 pieces of encoding data D0 to D3.

FIG. 6C represents the third compression case. Referring to FIG. 6C, in each sub-block SB of the non-focal region NFA, 16 pieces of image data may be compressed at the second compression rate and may thus be processed into 1 piece of encoding data D0.

Figure 7:
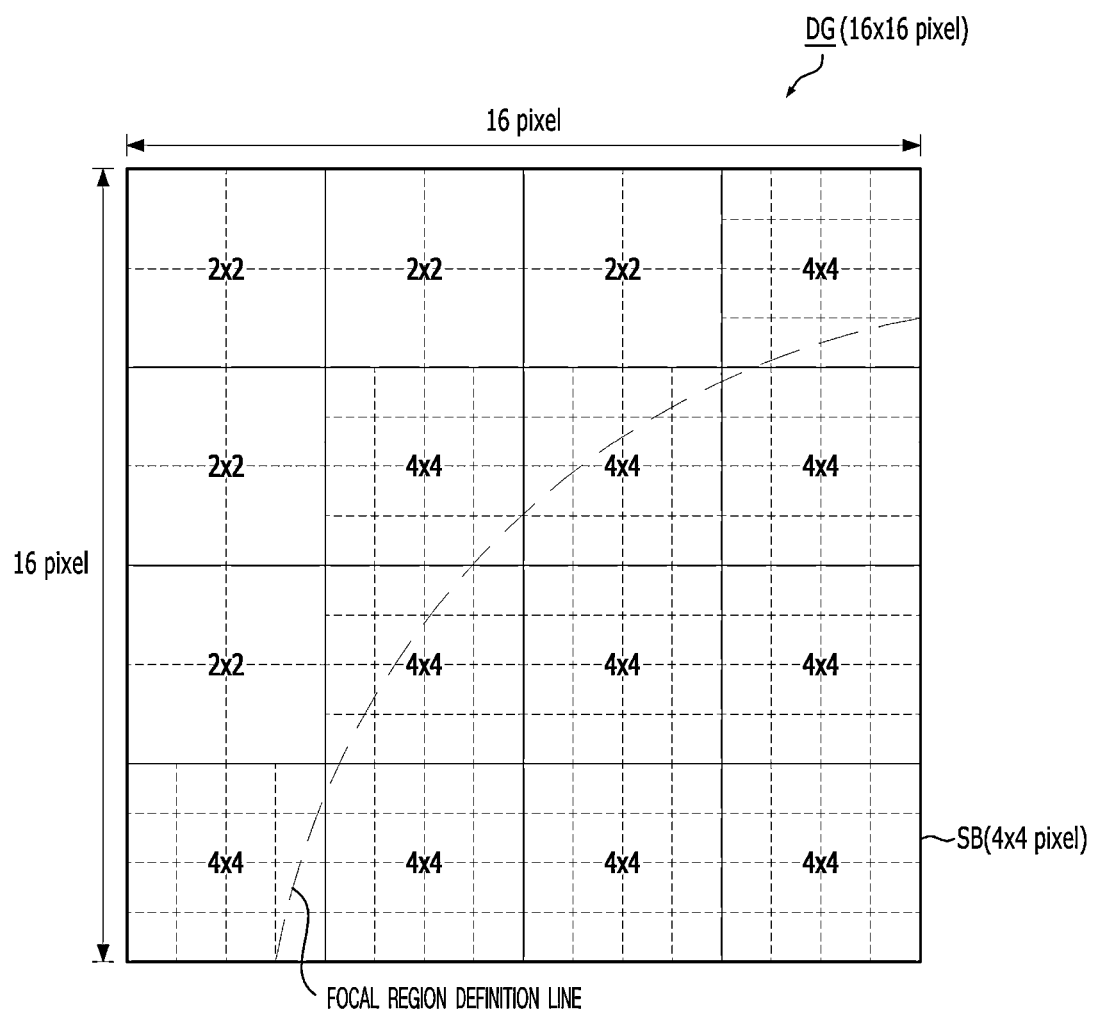
FIG. 7 is a diagram illustrating one data group according to an embodiment of the present disclosure.

FIG. 7 is a diagram illustrating one data group according to the present embodiment.

Referring to FIG. 7, in one data group DG, sub-blocks SB may respectively have different compression codes, and this may be changed based on focal region division and applied.

For example, the one data group DG may include a focal region FA including 11 sub-blocks SB having a compression code "4×4" and a semi-focal region SFA including 5 sub-blocks SB having a compression code "2×2".

Figure 8:
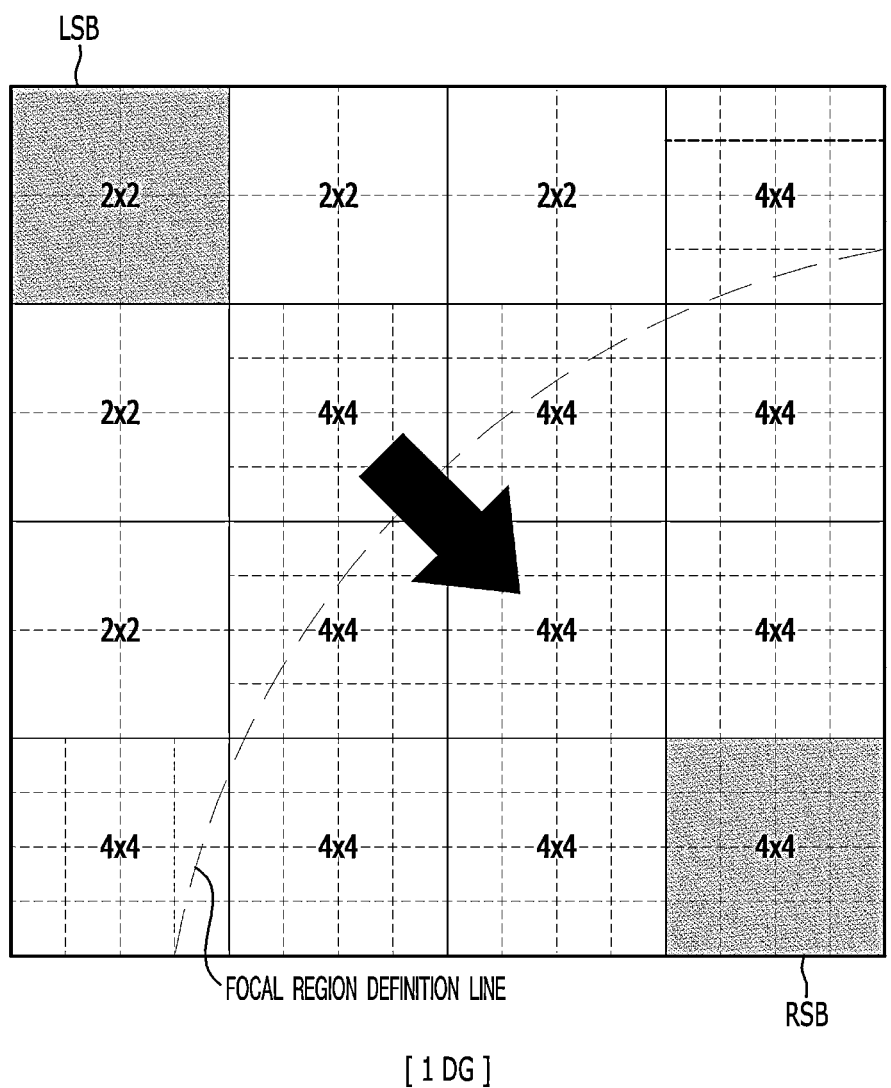
FIGS. 8 and 9 are diagrams illustrating an example where a representative compression case distribution of one data group configured with a first compression delimiter parameter of 2 bits according to an embodiment of the present disclosure.
Figures 9, 10:
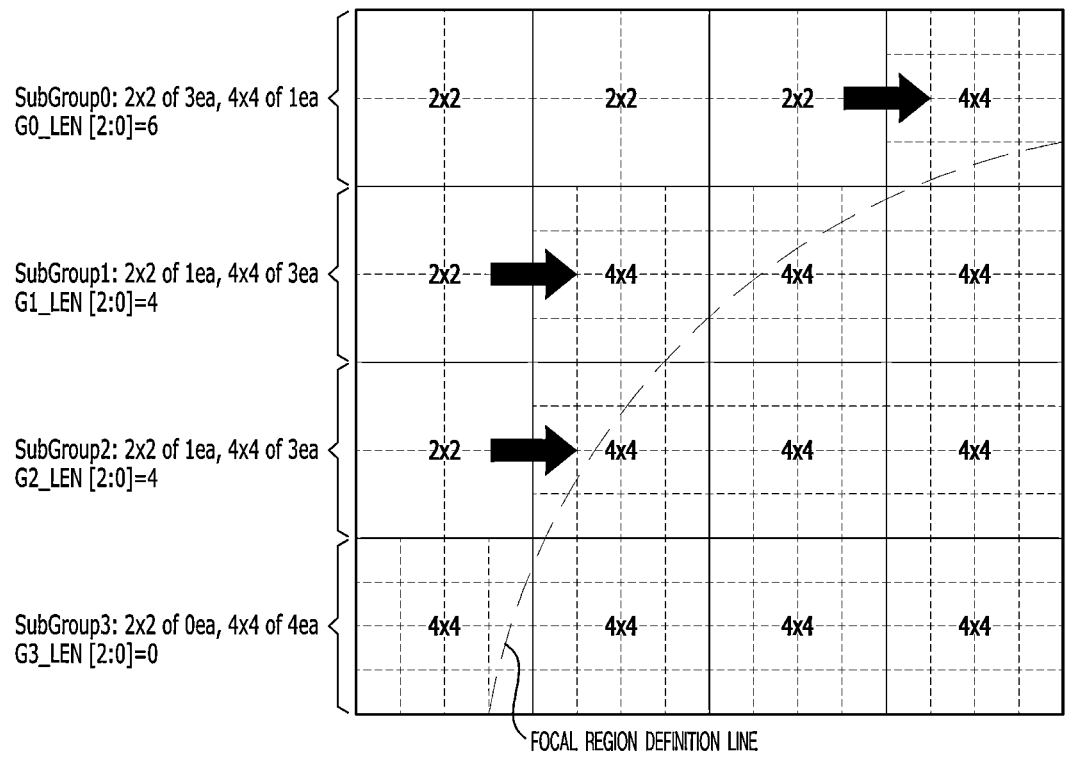
FIGS. 10 and 11 are diagrams illustrating an example where detailed compression case distributions of subgroups configuring one data group with a second compression delimiter parameter of 12 bits according to an embodiment of the present disclosure.

FIGS. 8 and 9 are diagrams illustrating an example where a representative compression case distribution of one data group according to the present embodiment is configured with a first compression delimiter parameter of 2 bits.

Referring to FIGS. 8 and 9, in order to optimize a size of a header packet of one data group DG, the present embodiment may have two conditions. First, each data group DG may include a maximum of two compression cases selected from among the first to third compression cases illustrated in FIGS. 6A to 6C. Second, each sub-block SB may include one compression case selected from among the first to third compression cases illustrated in FIGS. 6A to 6C.

The maximum of two compression cases may be a first compression delimiter parameter MCS[1,0] of 2 bits representing a representative compression case distribution of the one data group DG and may be set in a header packet. The first compression delimiter parameter MCS[1,0] may be determined based on a compression case distribution form between a first representative compression case and a second representative compression case configuring the maximum of two compression cases. Here, the first representative compression case may be a compression case of a left uppermost sub-block LSB of the one data group DG, and the first representative compression case may be a compression case of one sub-block RSB (hereinafter referred to as a comparison sub-block) of the other sub-blocks, except the left uppermost sub-block LSB, of the one data group DG. A position of the comparison sub-block RSB may be changed in the one data group DG.

When a first representative compression case of the left uppermost sub-block LSB corresponds to a compression code "1×1" of the non-focal region NFA and a second representative compression case of a comparison target sub-block RSB corresponds to a compression code "2×2" of the semi-focal region SFA, the first compression delimiter parameter MCS[1,0] may be "00", and a bit value thereof may be 0.

When the first representative compression case of the left uppermost sub-block LSB corresponds to the compression code "2×2" of the semi-focal region SFA and the second representative compression case of the comparison target sub-block RSB corresponds to the compression code "1×1" of the non-focal region NFA, the first compression delimiter parameter MCS[1,0] may be "01", and a bit value thereof may be 1.

When the first representative compression case of the left uppermost sub-block LSB corresponds to the compression code "2×2" of the semi-focal region SFA and the second representative compression case of the comparison target sub-block RSB corresponds to a compression code "4×4" of the focal region FA, the first compression delimiter parameter MCS[1,0] may be "10", and a bit value thereof may be 2.

When the first representative compression case of the left uppermost sub-block LSB corresponds to the compression code "4×4" of the focal region FA and the second representative compression case of the comparison target sub-block RSB corresponds to the compression code "2×2" of the semi-focal region SFA, the first compression delimiter parameter MCS[1,0] may be "11", and a bit value thereof may be 3.

As described above, with respect to representative compression cases of the left uppermost sub-block LSB and the comparison target sub-block RSB in the data group DG, a compression case distribution of the data group DG may be represented by a compression delimiter parameter MCS. In the embodiment of FIG. 8, the first representative compression case of the left uppermost sub-block LSB may correspond to the compression code "2×2" of the semi-focal region SFA, and the second representative compression case of the comparison target sub-block RSB may correspond to the compression code "4×4" of the focal region FA. Accordingly, the first compression delimiter parameter MCS[1,0] included in the header packet of the transfer data packet may be "10", and a bit value thereof may be 2.

Figures 11, 12A:
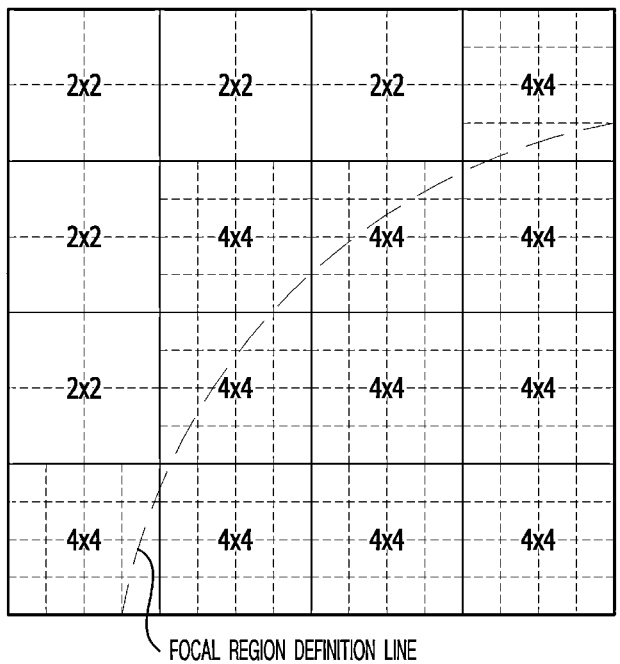

FIGS. 10 and 11 are diagrams illustrating an example where detailed compression case distributions of subgroups configuring one data group according to the present embodiment are configured with a second compression delimiter parameter of 12 bits.

Referring to FIG. 10, one data group may be divided into a plurality of subgroups 0 to 3, and each of the plurality of subgroups may be configured with a plurality of sub-blocks. In a case where one data group is configured with a size "16 pixel*16 pixel", the one data group may include four subgroups 0 to 3 having a size "4 pixel*4 pixel". Each of the subgroups 0 to 3 may include four sub-blocks having a size "4 pixel*4 pixel".

Referring to FIGS. 10 and 11, in order to optimize a size of a header packet of one data group DG, the present embodiment may add a second compression delimiter parameter G0/G1/G2/G3_LEN[2:0], representing detailed compression case distributions of the subgroups 0 to 3 configuring the one data group DG, to the header packet. The second compression delimiter parameter G0/G1/G2/G3_LEN[2:0] of each subgroup may be implemented with 3 bits. Accordingly, the second compression delimiter parameter G0/G1/G2/G3_LEN[2:0] of the four subgroups 0 to 3 may be a total of 12 bits.

As described above, the one data group DG may include first and second representative compression cases, and a compression case distribution of the data group DG may be a first compression delimiter parameter MCS[1,0] and may be in a header packet.

In this case, the second compression delimiter parameter G0/G1/G2/G3_LEN[2:0] may be determined so that the first representative compression case represents the number of continuous sub-blocks (number of 1st ENC case of FIG. 11) and the second representative compression case represents the number of continuous sub-blocks (number of 2nd ENC case of FIG. 11), for each of the subgroups 0 to 3.

Referring to FIG. 11, when the number of 1st ENC cases is 0 and the number of 2nd ENC cases is 4, the second compression delimiter parameter G0/G1/G2/G3_LEN[2:0] may be "000", and a bit value thereof may be 0.

When the number of 1st ENC cases is 0 and the number of 2nd ENC cases is 3, the second compression delimiter parameter G0/G1/G2/G3_LEN[2:0] may be "001", and a bit value thereof may be 1.

When the number of 1st ENC cases is 0 and the number of 2nd ENC cases is 2, the second compression delimiter parameter G0/G1/G2/G3_LEN[2:0] may be "010", and a bit value thereof may be 2.

When the number of 1st ENC cases is 0 and the number of 2nd ENC cases is 1, the second compression delimiter parameter G0/G1/G2/G3_LEN[2:0] may be "011", and a bit value thereof may be 3.

When the number of 1st ENC cases is 1 and the number of 2nd ENC cases is 3, the second compression delimiter parameter G0/G1/G2/G3_LEN[2:0] may be "100", and a bit value thereof may be 4.

When the number of 1st ENC cases is 2 and the number of 2nd ENC cases is 2, the second compression delimiter parameter G0/G1/G2/G3_LEN[2:0] may be "101", and a bit value thereof may be 5.

When the number of 1st ENC cases is 3 and the number of 2nd ENC cases is 1, the second compression delimiter parameter G0/G1/G2/G3_LEN[2:0] may be "110", and a bit value thereof may be 6.

When the number of 1st ENC cases is 4 and the number of 2nd ENC cases is 0, the second compression delimiter parameter G0/G1/G2/G3_LEN[2:0] may be "111", and a bit value thereof may be 7.

In the embodiment of FIG. 10, a second compression delimiter parameter G0_LEN[2:0] of a subgroup 0 may be "110", and a bit value thereof may be 6.

A second compression delimiter parameter G1_LEN[2:0] of a subgroup 1 may be "100", and a bit value thereof may be 4.

A second compression delimiter parameter G2_LEN[2:0] of a subgroup 2 may be "100", and a bit value thereof may be 4.

A second compression delimiter parameter G3_LEN[2:0] of a subgroup 3 may be "000", and a bit value thereof may be 0.

In this case, second compression delimiter parameters of four subgroups included in a header packet may be "110 100 100 000" implemented with a total of 12 bits.

Moreover, in the data group of FIG. 10, first and second compression delimiter parameters included in a header packet of a transfer data packet may be "10 110 100 100 000" implemented with a total of 14 bits.

FIGS. 12A, 12B, 12C and 12D are diagrams illustrating configuration examples of first and second compression delimiter parameters corresponding to various types of data groups.

Referring to FIG. 12A, a first representative compression case of a left uppermost sub-block may correspond to a compression code "2×2" of a semi-focal region SFA, and a second representative compression case of a comparison target sub-block may correspond to a compression code "4×4" of a focal region FA. Accordingly, a first compression delimiter parameter MCS[1,0] included in a header packet of a transfer data packet may be "10", and a bit value thereof may be 2.

Referring to FIG. 12A, a second compression delimiter parameter G0_LEN[2:0] included in a header packet of a subgroup 0 may be "110", and a bit value thereof may be 6. A second compression delimiter parameter G1_LEN[2:0] included in a header packet of a subgroup 1 may be "100", and a bit value thereof may be 4. A second compression delimiter parameter G2_LEN[2:0] included in a header packet of a subgroup 2 may be "100", and a bit value thereof may be 4. A second compression delimiter parameter G3_LEN[2:0] included in a header packet of a subgroup 3 may be "000", and a bit value thereof may be 0.

Figure 12B:
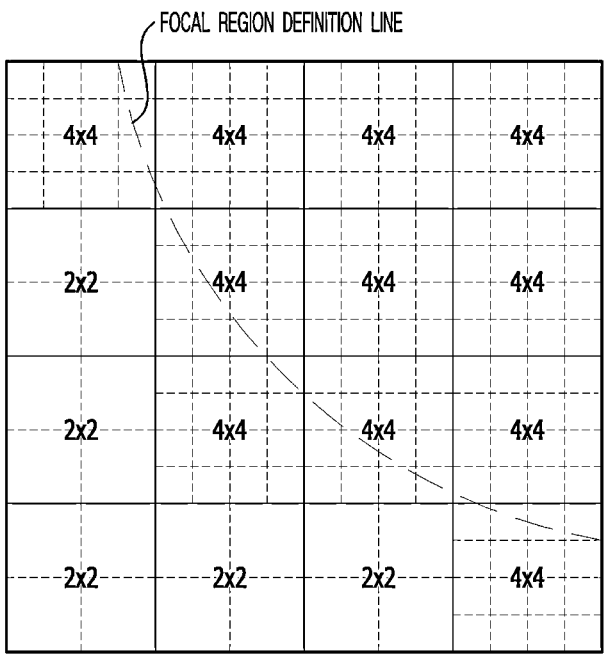

Referring to FIG. 12B, a first representative compression case of a left uppermost sub-block may correspond to a compression code "4×4" of a focal region FA, and a second representative compression case of a comparison target sub-block may correspond to a compression code "2×2" of a semi-focal region SFA. Accordingly, a first compression delimiter parameter MCS[1,0] included in a header packet of a transfer data packet may be "11", and a bit value thereof may be 3.

Referring to FIG. 12B, a second compression delimiter parameter G0_LEN[2:0] included in a header packet of a subgroup 0 may be "111", and a bit value thereof may be 7. A second compression delimiter parameter G1_LEN[2:0] included in a header packet of a subgroup 1 may be "100", and a bit value thereof may be 4. A second compression delimiter parameter G2_LEN[2:0] included in a header packet of a subgroup 2 may be "100", and a bit value thereof may be 4. A second compression delimiter parameter G3_LEN[2:0] included in a header packet of a subgroup 3 may be "110", and a bit value thereof may be 6.

Figure 12C:
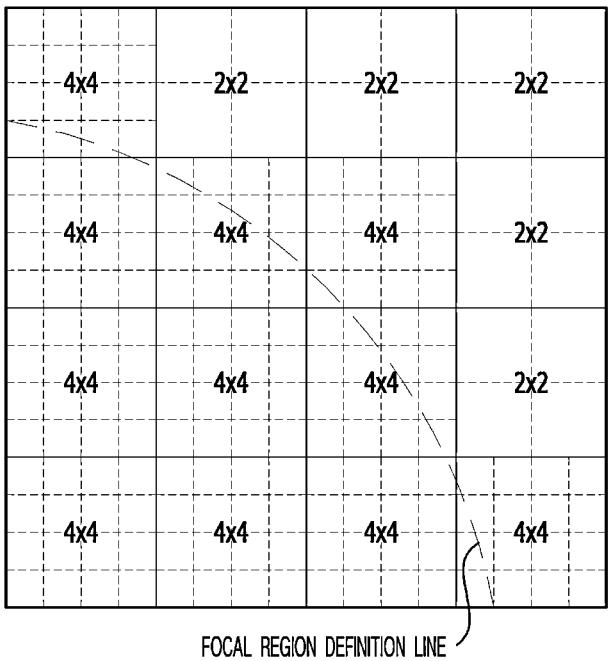

Referring to FIG. 12C, a first representative compression case of a left uppermost sub-block may correspond to a compression code "4×4" of a focal region FA, and a second representative compression case of a comparison target sub-block may correspond to a compression code "2×2" of a semi-focal region SFA. Accordingly, a first compression delimiter parameter MCS[1,0] included in a header packet of a transfer data packet may be "11", and a bit value thereof may be 3.

Referring to FIG. 12C, a second compression delimiter parameter G0_LEN[2:0] included in a header packet of a subgroup 0 may be "100", and a bit value thereof may be 4. A second compression delimiter parameter G1_LEN[2:0] included in a header packet of a subgroup 1 may be "110", and a bit value thereof may be 6. A second compression delimiter parameter G2_LEN[2:0] included in a header packet of a subgroup 2 may be "110", and a bit value thereof may be 6. A second compression delimiter parameter G3_LEN[2:0] included in a header packet of a subgroup 3 may be "111", and a bit value thereof may be 7.

Figure 12D:
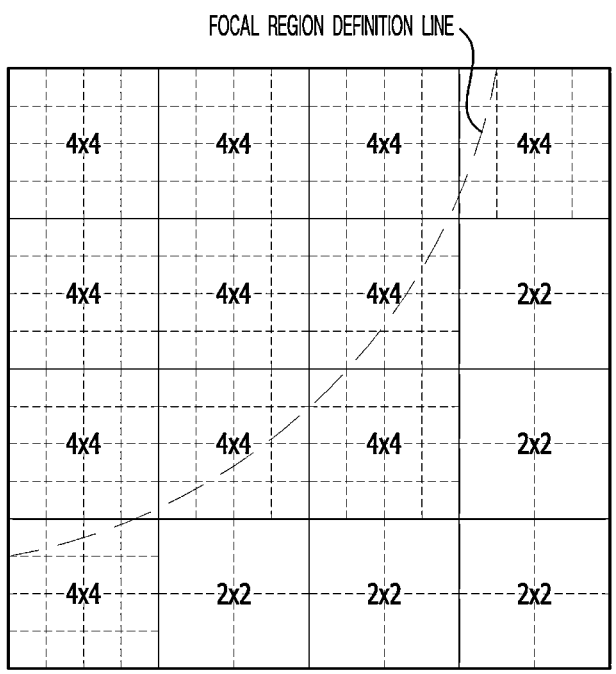

Referring to FIG. 12D, a first representative compression case of a left uppermost sub-block may correspond to a compression code "4×4" of a focal region FA, and a second representative compression case of a comparison target sub-block may correspond to a compression code "2×2" of a semi-focal region SFA. Accordingly, a first compression delimiter parameter MCS[1,0] included in a header packet of a transfer data packet may be "11", and a bit value thereof may be 3.

Referring to FIG. 12D, a second compression delimiter parameter G0_LEN[2:0] included in a header packet of a subgroup 0 may be "111", and a bit value thereof may be 7. A second compression delimiter parameter G1_LEN[2:0] included in a header packet of a subgroup 1 may be "110", and a bit value thereof may be 6. A second compression delimiter parameter G2_LEN[2:0] included in a header packet of a subgroup 2 may be "110", and a bit value thereof may be 6. A second compression delimiter parameter G3_LEN[2:0] included in a header packet of a subgroup 3 may be "100", and a bit value thereof may be 4.

Figure 13:
- FIG. 13 is a diagram illustrating an example where one transfer data packet is configured with a header packet and an image data packet according to an embodiment of the present disclosure.
Figure 14:
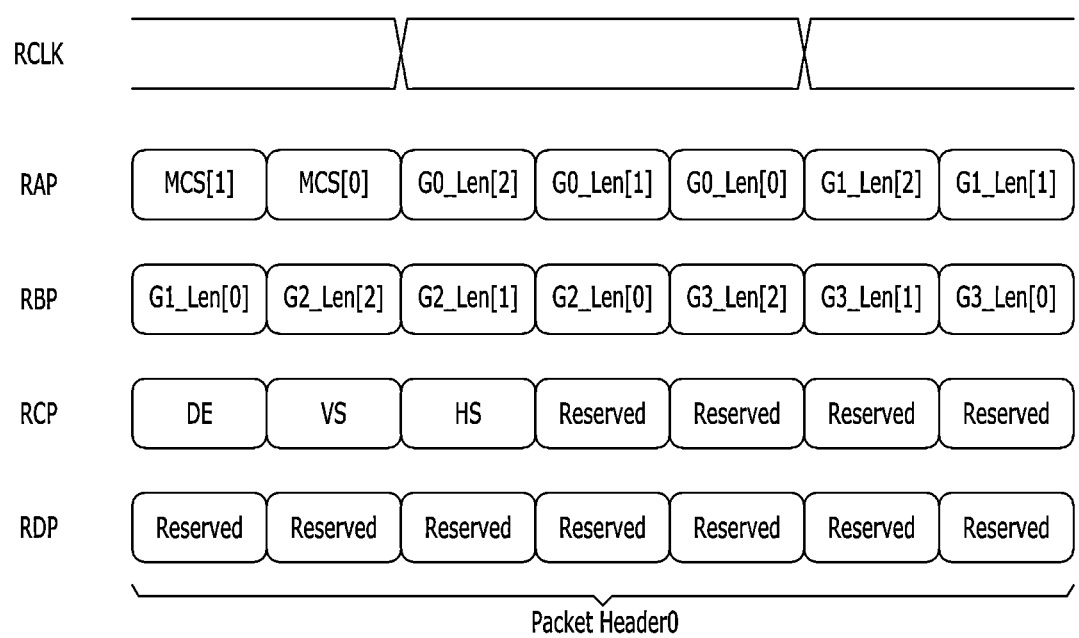
FIG. 14 is a diagram illustrating a configuration example of the header packet of FIG. 13 according to an embodiment of the present disclosure.
Figure 15:
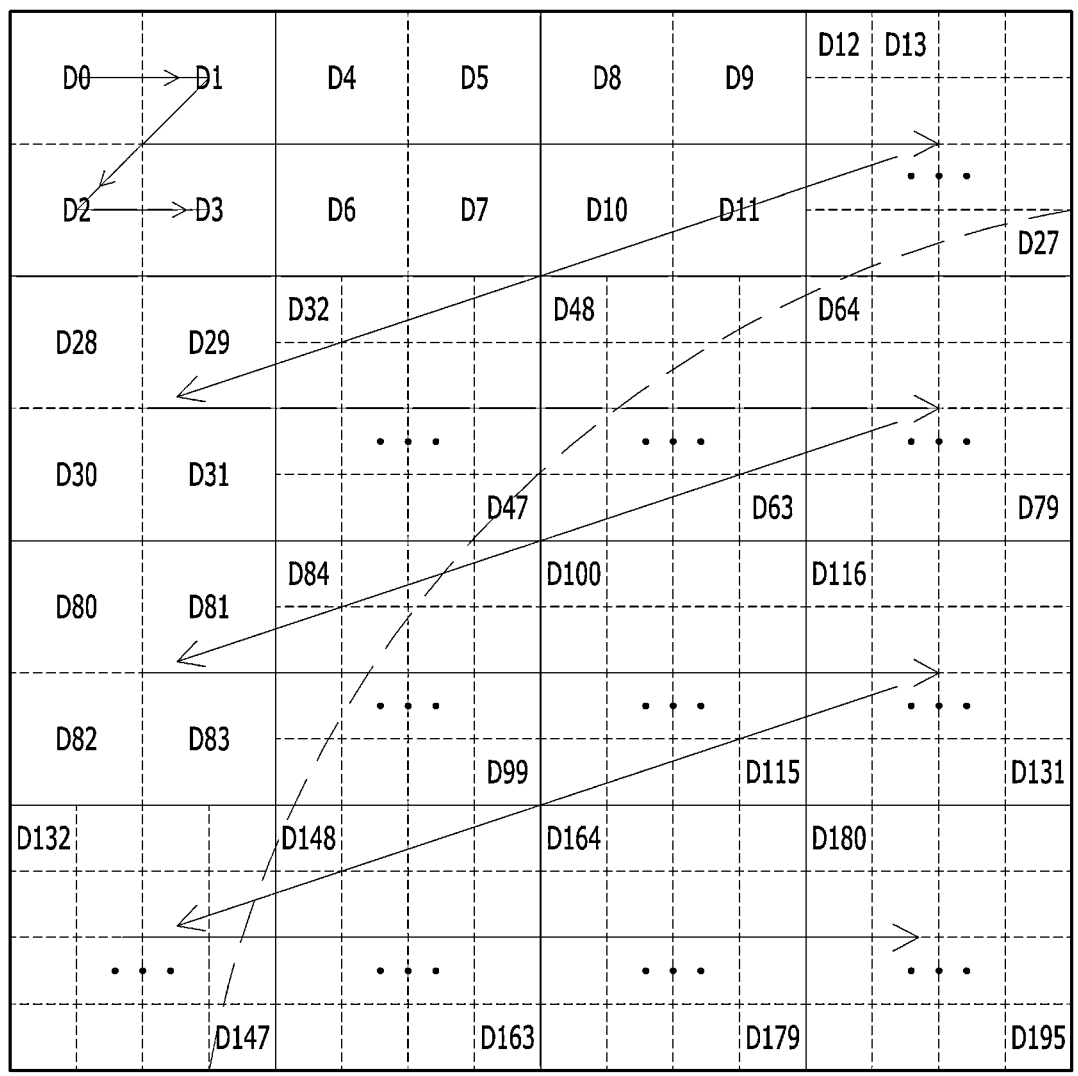
FIG. 15 is a diagram illustrating a transfer order of the image data packet of FIG. 13 according to an embodiment of the present disclosure.

FIG. 13 is a diagram illustrating an example where one transfer data packet is configured with a header packet and an image data packet. FIG. 14 is a diagram illustrating a configuration example of the header packet of FIG. 13. FIG. 15 is a diagram illustrating a transfer order of the image data packet of FIG. 13.

Referring to FIGS. 13 and 14, an LVDS interface according to the present embodiment may synchronize 28 pieces of data with one clock RCLK to transfer the data. The LVDS interface may easily allocate 25 bits, except 3 bits for timing synchronization signals DE, VS, and HS in one header packet, to the transfer of valid data (compression division information).

Referring to FIG. 14, in the present embodiment, compression division information of one data group may be configured with 14 bits by using a first compression delimiter parameter MCS[1,0] representing a representative compression case distribution of one data group and a second compression delimiter parameter G0~3_LEN[2:0] representing a compression case distribution of each subgroup. Also, in the present embodiment, the compression division information of the one data group may be transferred by being added to one header packet.

Referring to FIG. 15, 196 pieces of image data D0 to D195 may be transferred through the LVDS interface subsequently to the header packet of the one data group. The 196 pieces of image data D0 to D195 may be configured with a data packet one-by-one and transferred in an arrow-direction order of FIG. 15.

FIG. 16 is a diagram illustrating an example where a size of a header packet according to the present embodiment decreases compared to the related art. FIG. 17 is a diagram illustrating a comparison result of a size increase rate of a header packet based a size of one data group according to the present embodiment by comparing with the related art.

FIG. 16 shows the amount of data based on Foveated Rendering encoding in UHD (3840×2160) resolution. It has been assumed that a focal region is configured with a size where a diameter is 192 pixel, and a semi-focal region is formed at a point apart from a boundary line of the focal region by 32 pixel. According to such an assumption, the focal region may include 112 data groups, and the semi-focal region may include 80 data groups.

According to the present embodiment, the amount of data in a header packet may decrease by about half compared to the related art. According to calculation, in the present embodiment, the total number of data may be 13,409,280, and it may be seen that the amount of data decreases by 5.4% of 14,186,880 of the related art.

Referring to FIG. 17, according to the present embodiment, when a size of a data group is "16 pixel*16 pixel", header data may be 14 bits (2 bits (MCS)+3 bits (LEN) *4EA), and when a size of a data group is "32 pixel*32 pixel", header data may be 26 bits (2 bits (MCS)+3 bits (LEN)*8EA).

In a conventional structure, when a size of a data group increases from "16 pixel*16 pixel" to "32 pixel*32 pixel", header data has increased by 400% from 32 bits to 128 bits, but in the present embodiment, it may be seen that header data increases by 186% from 14 bits to 268 bits, under the same condition.

The present embodiment may realize the following effect.

The present embodiment may decrease a size of a header packet and may increase data transfer performance when transferring image data being compressed.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A data interface device of a display apparatus, the data interface device comprising:
   a packet configuration circuit configured to:
      divide image data into a plurality of data groups, the image data comprising compressed image data or non-compressed image data,
      divide each of the plurality of data groups into a plurality of subgroups,
      divide each of the plurality of subgroups into a plurality of sub-blocks, and
      configure a transfer data packet including a header packet and an image data packet by units of one data group, based on an eye-gaze focus of a user,
   wherein the header packet comprises a first compression delimiter parameter representing a representative compression case distribution of the one data group and a second compression delimiter parameter representing detailed compression case distributions of subgroups configuring the one data group.

2. The data interface device of claim 1, further comprising:
   an eye-gaze focus detection circuit configured to detect a left eye-gaze focus gazed by a left eye of the user and a right eye-gaze focus gazed by a right eye of the user; and
   a data compression circuit configured to, based on the left eye-gaze focus and the right eye-gaze focus:
      divide the image data into a focal region, a non-focal region disposed outside the focal region, and a semi-focal region disposed between the focal region and the non-focal region,
      perform non-compression of the focal region according to a first compression case,
      compress the semi-focal region at a first compression rate according to a second compression case, and compress the non-focal region at a second compression rate which is higher than the first compression rate, according to a third compression case.

3. The data interface device of claim 2, wherein each of the plurality of data groups comprises a maximum of two compression cases selected from among the first compression case, the second compression case, and the third compression case, and
each of the plurality of sub-blocks comprises one compression case selected from among the first compression case, the second compression case, and the third compression case.

4. The data interface device of claim 3, wherein the first compression delimiter parameter is determined based on a compression case distribution form between a first representative compression case and a second representative compression case configuring the maximum of two compression cases,
the first representative compression case is a compression case of a left uppermost sub-block of the one data group, and
the second representative compression case is a compression case of one of other sub-blocks, except the left uppermost sub-block, of the one data group.

5. The data interface device of claim 4, wherein the second compression delimiter parameter is determined so that the first representative compression case represents a number of continuous sub-blocks and the second representative compression case represents the number of continuous sub-blocks, for each of the plurality of subgroups.

6. The data interface device of claim 1, wherein 14-bit compression delimiter information is allocated to the header packet of the transfer data packet, and the 14-bit compression delimiter information comprises the first compression delimiter parameter of 2 bits and the second compression delimiter parameter of 12 bits.

7. A data interface method of a display apparatus, the data interface method comprising:
dividing image data into a plurality of data groups, dividing each of the plurality of data groups into a plurality of subgroups, and dividing each of the plurality of subgroups into a plurality of sub-blocks, based on an eye-gaze focus of a user, the image data comprising compressed image data or non-compressed image data; and
configuring a transfer data packet including a header packet and an image data packet by units of one data group,
wherein the header packet comprises a first compression delimiter parameter representing a representative compression case distribution of the one data group and a second compression delimiter parameter representing detailed compression case distributions of subgroups configuring the one data group.

8. The data interface method of claim 7, further comprising:
detecting a left eye-gaze focus gazed by a left eye of the user and a right eye-gaze focus gazed by a right eye of the user; and
based on the left eye-gaze focus and the right eye-gaze focus,
dividing the image data into a focal region, a non-focal region disposed outside the focal region, and a semi-focal region disposed between the focal region and the non-focal region,
performing non-compression of the focal region according to a first compression case,
compressing the semi-focal region at a first compression rate according to a second compression case, and
compressing the non-focal region at a second compression rate which is higher than the first compression rate, according to a third compression case.

9. The data interface method of claim 8, wherein each of the plurality of data groups comprises a maximum of two compression cases selected from among the first compression case, the second compression case, and the third compression case, and
each of the plurality of sub-blocks comprises one compression case selected from among the first compression case, the second compression case, and the third compression case.

10. The data interface method of claim 9, wherein the first compression delimiter parameter is determined based on a compression case distribution form between a first representative compression case and a second representative compression case configuring the maximum of two compression cases,
the first representative compression case is a compression case of a left uppermost sub-block of the one data group, and
the second representative compression case is a compression case of one of other sub-blocks, except the left uppermost sub-block, of the one data group.

11. The data interface method of claim 10, wherein the second compression delimiter parameter is determined so that the first representative compression case represents a number of continuous sub-blocks and the second representative compression case represents the number of continuous sub-blocks, for each of the plurality of subgroups.

12. The data interface method of claim 7, wherein 14-bit compression delimiter information is allocated to the header packet of the transfer data packet, and
the 14-bit compression delimiter information comprises the first compression delimiter parameter of 2 bits and the second compression delimiter parameter of 12 bits.

* * * * *